United States Patent
Kitagawa et al.

(10) Patent No.: US 10,072,379 B2
(45) Date of Patent: Sep. 11, 2018

(54) METHOD FOR IMAGE FORMATION AND TEXTILE FIBER PRODUCTS

(71) Applicant: MATSUI SHIKISO CHEMICAL CO., LTD., Kyoto (JP)

(72) Inventors: Yosuke Kitagawa, Kyoto (JP); Masaki Kariya, Kyoto (JP); Daisuke Inoue, Kyoto (JP)

(73) Assignee: MATSUI SHIKISO CHEMICAL CO., LTD., Kyoto (JP)

( * ) Notice: Subject to any disclaimer, the term of this patent is extended or adjusted under 35 U.S.C. 154(b) by 158 days.

(21) Appl. No.: 14/748,719

(22) Filed: Jun. 24, 2015

(65) Prior Publication Data

US 2015/0375528 A1    Dec. 31, 2015

(30) Foreign Application Priority Data

Jun. 27, 2014  (JP) .................. 2014-132872

(51) Int. Cl.

| | |
|---|---|
| *D06P 5/30* | (2006.01) |
| *D06P 1/44* | (2006.01) |
| *D06P 1/52* | (2006.01) |
| *D06P 1/673* | (2006.01) |
| *C09D 11/30* | (2014.01) |
| *C09D 11/322* | (2014.01) |
| *C09D 11/10* | (2014.01) |

(52) U.S. Cl.
CPC ............. *D06P 5/30* (2013.01); *C09D 11/10* (2013.01); *C09D 11/322* (2013.01); *D06P 1/44* (2013.01); *D06P 1/525* (2013.01); *D06P 1/5221* (2013.01); *D06P 1/5257* (2013.01); *D06P 1/5285* (2013.01); *D06P 1/6735* (2013.01); *D06P 1/67341* (2013.01); *D06P 1/67358* (2013.01); *D06P 1/67375* (2013.01)

(58) Field of Classification Search
None
See application file for complete search history.

(56) References Cited

U.S. PATENT DOCUMENTS

| | | | | | |
|---|---|---|---|---|---|
| 4,831,098 | A | * | 5/1989 | Watanabe | C08G 18/0814 428/394 |
| 5,200,489 | A | * | 4/1993 | Jacobs | C08G 18/283 524/591 |
| 5,976,669 | A | * | 11/1999 | Fleming | C08G 18/61 264/1.9 |
| 2002/0180855 | A1 | * | 12/2002 | Kasperchik | B41M 5/0011 347/98 |
| 2012/0306976 | A1 | * | 12/2012 | Kitagawa | C09D 11/326 347/100 |

FOREIGN PATENT DOCUMENTS

| | | |
|---|---|---|
| JP | 2004-276253 A | 10/2004 |
| JP | 2009-215506 A | 9/2009 |
| JP | 2011-105805 A | 6/2011 |
| JP | 2011-246856 A | 12/2011 |
| JP | 49 69 578 B2 | 7/2012 |
| JP | 2012-251062 A | 12/2012 |
| JP | 53 37 351 B2 | 11/2013 |
| WO | 2014/039306 A1 | 3/2014 |

* cited by examiner

*Primary Examiner* — James M Mellott
(74) *Attorney, Agent, or Firm* — McGlew and Tuttle, P.C.

(57) ABSTRACT

A required portion of a textile fiber product is subjected to a fiber-modifying treatment by applying a fiber-modifying agent containing at least an aqueous polyvalent cationic salt solution and a urethane resin having a blocked isocyanate group at the end thereof, after which a masking ink containing at least a white or light-colored pigment, a water-soluble polymer dispersing agent, a self-emulsifying urethane resin and/or an acrylic resin having an acid value of 40 to 100 mg KOH/g, and an aqueous liquid as a solvent or disperse medium, is printed by an inkjet process.

21 Claims, No Drawings

METHOD FOR IMAGE FORMATION AND TEXTILE FIBER PRODUCTS

BACKGROUND OF THE INVENTION

1. Field of the Invention

The present invention relates to a method for image formation wherein an image is formed by an inkjet process on a textile fiber product which has been subjected to a fiber-modifying treatment and a textile fiber product obtained thereby.

2. Description of the Prior Art

In recent years, a method for image formation on a textile fiber product by an inkjet process has been developed with the advantage of obviation of the need for plate making.

When a dye is used as a colorant in an ink utilized in an inkjet process, it is necessary to change the dye (hence to change the ink containing the dye) is according to the kind of fiber, and problems arise from complex processes following inkjet printing, such as steaming, washing, soaping, and drying, and a tendency for increasing environmental loads.

Meanwhile, when using a pigment, which, unlike dyes, does not have substantivity for fibers, as a colorant in the ink, there are advantages in that unlike with dyes, textile fiber products of various fibers can be colored with a single kind of ink, although an binder is needed to bind the pigment to a fiber, and that the environmental load is low because of the obviation of the need for the steps of steaming and washing after printing.

However, when a pigment ink is inkjet-printed directly on a textile fiber product, the pigment ink penetrates the cloth product, which is configured with fiber, making it difficult to obtain high-density patterns, and the pigment ink undergoes migration, making it difficult to obtain brilliant images. For this reason, images formed using a pigment ink are likely to lack adequate concealing performance. Hence, when the textile fiber product to be printed has a color, pattern, and the like, the color, pattern, and the like on the back side appear at least to some extent on the image formed using the pigment ink; in this regard as well, expected brilliant images are unlikely to be obtained.

When the textile fiber product to be printed has a color, pattern, and the like, it is a common practice to form a masking layer that masks the color, pattern, and the like, and to form a desired image on the masking layer. However, when it is intended to form a masking layer on a textile fiber is product by an inkjet process using a white ink with concealing performance or the like, adequate concealing performance is unlikely to be obtained due to the penetration and migration of the white ink; therefore, it is difficult to form a desired brilliant image thereon.

Examples of past proposals concerning image formation by an inkjet process using an ink containing a pigment as a colorant include the techniques described in the references (1) to (3) below.

(1) JP 2004-276253 A

Described is a technique for generating a bleed-free good image of high image density by allowing a pretreating liquid for printing containing at least a water-soluble polyvalent metal salt, a surfactant, a high-boiling-point amine, a benzotriazole salt, and water to adhere to a recording medium such as paper for ordinary office work, and thereafter allowing an aqueous pigment ink to adhere thereto by an inkjet recording process.

(2) JP 4969578 B2

Described is a method for digital printing on a fabric, comprising:
(a) a step for pretreating a fabric with a pretreating liquid containing an aqueous polyvalent cationic salt solution,
(b) a step for digital-printing the pretreated fabric with an inkjet ink based on an aqueous white pigment, wherein the printed area is of substantially the same shape as that of a printed color image applied thereon, and
(c) a step for digital-printing the color image on the white ink using an aqueous color inkjet ink.

(3) JP 5337351 B2

Described is an inkjet printing method comprising applying a treating liquid containing a water-soluble polyvalent metal salt, a nonionic resin emulsion having a glass transition temperature of −30 to 0 degrees Celsius, and an aqueous medium to a printing region of a cloth, heating the cloth, printing a white ink for inkjet printing containing a white pigment on the region with the treating liquid applied thereto, and printing a chromatic ink for inkjet printing.

However, the proposals described in the aforementioned references (1) to (3) pose the problems shown below.

The technique described in the reference (1) mainly targets paper and plastic films as recording media. When it is used for a textile fiber product, which has rougher fiber texture than paper, the pretreating liquid is unlikely to adhere uniformly onto the fiber surface, and the inkjet ink penetrates easily in the fibers; therefore, it is difficult to form a brilliant image of excellent concealing performance.

The technique described in the reference (2) is a technique for printing a textile pretreated with a pretreating liquid containing an aqueous polyvalent cationic salt solution with an inkjet ink based on an aqueous white pigment, and printing an aqueous ordinary ink on the printed image, ensuring concealing performance by the ink based on the aqueous white pigment, and yielding a brilliant image; however, the binding of the fabric and the pigment in the ink is insufficient, and the fastness for a fabric is not considered to be adequate.

The technique described in the reference (3) is intended to perform printing with concealing performance and excellent durability by treating a cloth with a treating liquid containing a water-soluble polyvalent metal salt and a resin emulsion, and then printing a white ink for inkjet printing; however, the binding of the resin emulsion in the treating liquid and the white pigment in the ink is insufficient, and the fastness for a cloth is not considered to be adequate.

As stated above, when using a pigment as a colorant in forming an image on a textile fiber product by an inkjet process, it is unnecessary to choose a pigment according to the kind of fiber, and the steps are relatively simple; however, this method poses problems, including difficulty with the obtainment of brilliant images and inadequate quality in feeling and fastness of the textile fiber product with an image formed thereon.

For this reason, there is a demand for the development of a method for image formation on a textile fiber product by an inkjet process using an ink with a pigment as a coloring agent, which makes it possible to obtain a brilliant image of excellent concealing performance and a product with good image fastness and a soft feeling, and a textile fiber product obtained using the method.

SUMMARY OF THE INVENTION

A problem to be solved by one aspect of the present invention is to provide a method for image formation making it possible to record a brilliant image of excellent concealing performance on a textile fiber product using a pigment ink, and to obtain an image-recorded textile fiber product with good quality such as in feeling and fastness, and a textile fiber product obtained using the method.

The present inventors conducted extensive investigations to found it possible to form a pigment-colored brilliant image of excellent concealing performance, a soft feeling, and excellent fastness by printing by an inkjet process a masking ink comprising at least a white or light-colored pigment, a water-soluble polymer dispersing agent, a self-emulsifying urethane resin and/or an acrylic resin having an acid value of 40 to 100 mg KOH/g, and an aqueous liquid as a solvent or disperse medium, on a textile fiber product which has been subjected to a fiber-modifying treatment with an aqueous polyvalent cationic salt solution and a urethane resin having a blocked isocyanate group at the end thereof by an inkjet process, and have developed the present invention.

According to the method for image formation in one aspect of the present invention, it is possible to form a high-density masking image of excellent concealing performance and/or a high-density ordinary image, and to obtain a textile fiber product with a soft feeling with a masking image and/or an ordinary image formed thereon, by subjecting a textile fiber product to a fiber-modifying treatment with an aqueous polyvalent cationic salt solution and a urethane resin having a blocked isocyanate group at the end thereof to prevent the bleeding of a masking ink and/or an ordinary ink printed by an inkjet process and the penetration thereof in the textile fiber product.

In addition, as a result of crosslinking reaction or condensation reaction between
(A) a urethane resin, which is applied to a textile fiber product in a fiber-modifying treatment, having a blocked isocyanate group at the end thereof and
both [(B) and (C)] or either one [(B) or (C)] of (B) a functional group(s) of a self-emulsifying urethane resin and/or an acrylic resin having an acid value of 40 to 100 mg KOH/g and (C) a functional group of a water-soluble polymer dispersing agent, in a masking ink and/or an ordinary ink,
the (A) urethane resin
and
both [(B) and (C)] or either one [(B) or (C)] of the (B) self-emulsifying urethane resin and/or the acrylic resin having an acid value of 40 to 100 mg KOH/g, and, the (C) water-soluble polymer dispersing agent, in the masking ink and/or the ordinary ink,
become a water-insoluble integral entity and bind firmly to the fiber in the textile fiber product while containing a pigment in the ink,
thus making it possible to pigment-color the textile fiber product with excellent fastness.

The method for image formation and textile fiber product in one or more embodiments of the present invention may be described as follows:

(1) A method for image formation having a masking printing step for printing a masking ink by an inkjet process on a portion that has been subjected to a specified fiber-modifying treatment in a textile fiber product to form a masking image,
wherein the specified fiber-modifying treatment has been performed by applying to the entire or a required portion of the textile fiber product at least an aqueous polyvalent cationic salt solution and a urethane resin having a blocked isocyanate group at the end thereof,
and wherein the masking ink contains at least a white or light-colored pigment, a water-soluble polymer dispersing agent, a self-emulsifying urethane resin and/or an acrylic resin having an acid value of 40 to 100 mg KOH/g, and an aqueous liquid as a solvent or disperse medium, and is capable of forming a white or light-colored masking image.

(2) The method for image formation in (1) above, having a fiber-modifying step for performing the specified fiber-modifying treatment on the entire or a required portion of the textile fiber product before performing the masking printing step.

(3) The method for image formation in (2) above, wherein the fiber-modifying treatment is performed by applying to the entire or a required portion of the textile fiber product a fiber-modifying agent containing at least an aqueous polyvalent cationic salt solution and a urethane resin having a blocked isocyanate group at the end thereof.

(4) The method for image formation in any one of the items (1) to (3) above, wherein the masking ink contains a block isocyanate compound as a curing agent for both or either one of a water-soluble polymer dispersing agent, and, a self-emulsifying urethane resin and/or an acrylic resin having an acid value of 40 to 100 mg KOH/g, in the ink.

(5) The method for image formation in any one of the items (1) to (4) above, wherein the rewetting rate of the masking ink ranges from 70 to 90%.

(6) The method for image formation in any one of the items (1) to (5), wherein the 100% modulus of the urethane resin having a blocked isocyanate group at the end thereof, used for the fiber-modifying treatment, is not more than 30 MPa.

(7) The method for image formation in any one of the items (1) to (6), wherein the fiber-modifying treatment contains heating a portion of the textile fiber product to which at least an aqueous polyvalent cationic salt solution and a urethane resin having a blocked isocyanate group at the end thereof have been applied, at 100 to 180 degrees Celsius for 10 to 180 seconds.

(8) The method for image formation in any one of the items (1) to (7), having an image heat treatment step for performing heat treatment on at least a portion of the textile fiber product where the masking image has been formed, at 100 to 220 degrees Celsius for 1 to 10 minutes.

(9) The method for image formation in any one of the items (1) to (8), having a post-treatment step for performing a post-treatment by applying a post-treating agent to at least a portion of the textile fiber product where the masking image has been formed.

(10) The method for image formation in any one of the items (1) to (7), having an ordinary printing step for printing an ordinary ink by an inkjet process on a portion or all of the masking image formed by the masking printing step, to form an ordinary image,
wherein the ordinary ink contains at least a pigment, a water-soluble polymer dispersing agent, a self-emulsifying urethane resin and/or an acrylic resin having an acid value of 40 to 100 mg KOH/g, and an aqueous liquid as a solvent or disperse medium, and is capable of forming an ordinary image.

(11) The method for image formation in (10), wherein the ordinary ink contains a block isocyanate compound as a curing agent for both or either one of a water-soluble polymer dispersing agent, and, a self-emulsifying urethane resin and/or an acrylic resin having an acid value of 40 to 100 mg KOH/g, in the ink.

(12) The method for image formation in the item (10) or (11) above, wherein the rewetting rate of the ordinary ink ranges from 70 to 90%.

(13) The method for image formation in any one of the items (10) to (12), having an image heat treatment step for performing heat treatment on at least a portion of the textile fiber product where the masking image and/or ordinary image has been formed, at 100 to 220 degrees Celsius for 1 to 10 minutes.

(14) The method for image formation in any one of the items (10) to (13), containing a post-treatment step for performing a post-treatment by applying a post-treating agent to at least a portion of the textile fiber product where the masking image and/or ordinary image has been formed.

(15) The method for image formation in (9) or (14) above, wherein the post-treating agent is at least one of an acrylic resin emulsion, a urethane resin emulsion, a crosslinking agent, a plasticizer, a surfactant, a is flame retardant, a silicone-based softening agent, and a fluorine-based water repellent, and wherein the post-treatment step contains performing heat treatment on a portion of the textile fiber product to which the post-treating agent has been applied, at 100 to 180 degrees Celsius for 10 to 180 seconds.

(16) A textile fiber product having an image formed thereon using the method for image formation in any one of the items (1) to (15) above.

The method for image formation in one aspect of the present invention is effective as follows:

First, by subjecting a textile fiber product to a fiber-modifying treatment with an aqueous polyvalent cationic salt solution and a urethane resin having a blocked isocyanate group at the end thereof, it is possible to prevent a masking ink and/or an ordinary ink from bleeding and penetrating the textile fiber product, allowing a high-density masking image of excellent concealing performance and/or a high-density ordinary image to be formed, without reducing the fastness of a masking ink image and/or ordinary image printed by an inkjet process, and the feeling of the textile fiber product with the masking image and/or ordinary image formed thereon can be softened.

In addition, as a result of crosslinking reaction or condensation reaction between a urethane resin, which is applied to a textile fiber product in a fiber-modifying treatment, having a blocked isocyanate group at the end thereof and both or either one of a functional group(s) of a self-emulsifying urethane resin and/or an acrylic resin having an acid value of 40 to 100 mg KOH/g and a functional group of a water-soluble polymer dispersing agent, in a masking ink and/or an ordinary ink, the urethane resin and both or either one of the self-emulsifying urethane resin and/or the acrylic resin having an acid value of 40 to 100 mg KOH/g, and, the water-soluble polymer dispersing agent, in the masking ink and/or the ordinary ink, become a water-insoluble integral entity and bind firmly to the fiber in the textile fiber product while containing a pigment in the ink, thus making it possible to pigment-color the textile fiber product with excellent fastness.

DETAILED DESCRIPTION OF THE INVENTION

Modes for embodying the present invention are described below.

(1) Textile Fiber Product

Textile fiber products that can serve as subjects for the method for image formation of the present invention include material cloths, garments (T-shirts, sweatshirts, jerseys, pants, one-piece dresses, blouses, hats and caps, socks, and the like), apparel accessories (handkerchiefs, neckties, cloth belts, and the like), and other products (shoes, beddings, curtains, carpets, wall cloths, bags, flags, and the like), made of woven fabrics, knits, non-woven fabrics, gigged cloths, and the like configured with various fibers. Even those having a portion configured with a non-fiber component are, as a rule, not excluded from the scope of subjects of the present invention.

The fiber that constitutes the textile fiber product, as a rule, is also subject to no limitations; examples include textile fiber products configured with any of various synthetic fibers, semi-synthetic fibers, natural fibers, and inorganic fibers (including blended yarn thereof) such as nylon, polyester, acrylic fiber, lactate fiber, acetate, rayon, cotton, silk, wool, hemp, and glass fiber.

(2) Fiber-modifying Treatment

The fiber-modifying treatment in the present invention is performed by applying at least an aqueous polyvalent cationic salt solution and a urethane resin having a blocked isocyanate group at the end thereof to the entire or a required portion of a textile fiber product (for example, impregnating in, or adhering to, the textile fiber product). An aqueous polyvalent cationic salt solution and a urethane resin having a blocked isocyanate group at the end thereof can be applied as a fiber-modifying agent containing both, and both may be applied separately.

The method for image formation of the present invention encompasses not only methods containing a fiber-modifying step for a textile fiber product, but also cases where a textile fiber product has been subjected to a fiber-modifying treatment in advance.

(2-1) Aqueous Polyvalent Cationic Salt Solution

The aqueous polyvalent cationic salt solution applied to a textile fiber product in the fiber-modifying treatment forms an ion complex with the masking ink and/or ordinary ink later printed by an inkjet process.

For this reason, it is possible to prevent a masking ink and/or an ordinary ink from bleeding and penetrating the textile fiber product, allowing a high-density masking image of excellent concealing performance and/or a high-density ordinary image to be formed, without reducing the fastness of a masking ink image and/or ordinary image, and the feeling of the textile fiber product with the masking image and/or ordinary image formed thereon can be softened.

The amount of aqueous polyvalent cationic salt solution applied in the fiber-modifying treatment can be an amount that prevents a masking ink and/or an ordinary ink from bleeding and penetrating the textile fiber product. Too large an amount applied can reduce the fastness, such as water resistance, of the masking image and/or ordinary image, and too small an amount applied can make the prevention of the bleeding and penetration of the masking ink and/or ordinary ink inadequate.

An aqueous polyvalent cationic salt solution is an aqueous solution of one kind or two kinds or more of polyvalent cationic salts (divalent or higher cationic salt) configured with a divalent or higher polyvalent metal ion and an anion.

Examples of the divalent or higher polyvalent metal ion include $Ca^{2+}$, $Mg^{2+}$, $Zn^{2+}$, $Cu^{2+}$, $Ni^{2+}$, and $Al^{3+}$.

Examples of the anion include $Cl^-$, $Br^-$, $I^-$, $OH^-$, $NO_3^-$, $CH_3COO^-$, and $SO_4^{2-}$.

Specifically, examples of the aforementioned polyvalent cationic salt include, but are not limited to, calcium chloride, calcium acetate, calcium nitrate, magnesium sulfate, magnesium acetate, zinc chloride, copper nitrate, copper sulfate, nickel sulfate, aluminum nitrate, and the like.

(2-2) Urethane Resin Having a Blocked Isocyanate Group at the End Thereof

The urethane resin applied to a textile fiber product in the fiber-modifying treatment has a blocked isocyanate group at the end thereof. This urethane resin crosslinks and condenses with both or either one of a functional group of a self-emulsifying urethane resin and/or an acrylic resin having an acid value of 40 to 100 mg KOH/g and a functional group of a water-soluble polymer dispersing agent, in the masking ink inkjet-printed in the masking printing step and/or the ordinary ink inkjet-printed in the ordinary printing step. Thereby, the urethane resin and both or either one of the self-emulsifying urethane resin and/or the acrylic resin having an acid value of 40 to 100 mg KOH/g and the water-soluble polymer dispersing agent, in the masking ink and/or ordinary ink, become a water-insoluble integral entity and bind firmly to the fiber in the textile fiber product while containing a pigment in the ink, thus pigment-coloring the textile fiber product.

Urethane resin refers generically to polymeric compounds having a urethane bond, and is obtained industrially by a polyaddition reaction of polyisocyanate with polyol. In view of recently emerging issues concerning the global environment, it is preferable that the urethane resin having a blocked isocyanate group at the end thereof in the present invention be an aqueous urethane resin.

Generally, aqueous urethane resins can be roughly divided into non-reaction type urethane resins and reaction type urethane resins.

Non-reaction type urethane resins are classified according to the method of their manufacture into the water-soluble type, which is prepared by polymerization using a hydrophilic polyol, the self-emulsifying type, which is prepared by adding a hydrophilic group to the end of urethane resin, and emulsified in water owing to the hydrophilic group, or the forcibly emulsified type, which is prepared by polymerization in the presence of a surfactant, and are used for adhesives, coatings, and other applications because of their excellence in the expression of film properties.

On the other hand, reaction type urethane resins are urethane resins with an isocyanate group protected with a blocking agent, and, like non-reaction type urethane resins, are classified according to the method of their manufacture into the water-soluble type, self-emulsifying type, and forcibly emulsified type.

Reaction type urethane resins are characterized in that a temporarily stable compound is formed because of the protection of the isocyanate group, which is highly reactive, with a blocking agent. Thereafter, the blocking agent is dissociated by an appropriate heat treatment, and the isocyanate group is regenerated. The regenerated isocyanate group, via self-crosslinking, reactions with active hydrogen compounds (amino group, hydroxyl group, water, and the like), and other processes, produces urethane bonds or urea bonds, resulting in three-dimensional crosslinking.

In the present invention, with the use of a urethane resin having a blocked isocyanate group at the end thereof in fiber-modifying treatment, the urethane resin crosslinks with both or either one of a functional group of a self-emulsifying urethane resin and/or an acrylic resin having an acid value of 40 to 100 mg KOH/g and a functional group of a water-soluble polymer dispersing agent, in an ink later printed by an inkjet process, and they become water-insoluble and bind to the textile fiber product. In addition, the urethane resin having a blocked isocyanate group at the end thereof per se condenses and binds to the textile fiber product, thus being capable of exhibiting primer-like function.

From the viewpoint of long-term storage stability and the fastness of the ink printed by an inkjet process after the fiber modification treatment, it is preferable that the urethane resin having a blocked isocyanate group at the end thereof in the present invention be a water-soluble or self-emulsifying urethane resin. Furthermore, to maintain the feeling and elasticity of the textile fiber product after the fiber modification, the 100% modulus of the urethane resin having a blocked isocyanate group at the end thereof in the present invention is preferably not more than 30 MPa, more preferably not more than 15 MPa. The 100% modulus of the urethane resin can be, for example, not less than 0.1 MPa.

In addition, to prevent the image formed on the textile fiber product from yellowing due to the influence of light, gaseous nitrogen oxide, and the like, the urethane resin having a blocked isocyanate group at the end thereof in the present invention is preferably a urethane resin prepared with an aliphatic isocyanate or alicyclic isocyanate as a starting material.

(2-3) Fiber-modifying Agent

A fiber-modifying agent that can be used for the fiber-modifying treatment of a textile fiber product in the present invention contains at least an aqueous polyvalent cationic salt solution and a urethane resin having a blocked isocyanate group at the end thereof.

In addition to the above-described components, the fiber-modifying agent may be blended as appropriate with, for example, water, a water-soluble organic solvent, an antioxidant, a drying inhibitor, an ultraviolet absorbent, a crosslinking catalyst, a plasticizer, a flame retardant, a defoaming agent, and the like.

The amount of aqueous polyvalent cationic salt solution blended in the fiber-modifying agent, can be, for example, 1 to 50% by weight in the fiber-modifying agent, to prevent the bleeding and penetration of the ink printed by an inkjet process after fiber-modifying treatment. Preferably, the amount of polyvalent cationic salt blended is not more than 30% by weight, more preferably not more than 10% by weight.

The amount of urethane resin having a blocked isocyanate group at the end thereof, blended in the fiber-modifying agent, is preferably an amount that is appropriate for allowing the urethane resin to crosslink with both or either one of a functional group of a self-emulsifying urethane resin and/or an acrylic resin having an acid value of 40 to 100 mg KOH/g and a functional group of a water-soluble polymer dispersing agent, in the ink to be printed by an inkjet process after fiber-modifying treatment, and to become water-insoluble and bind to the textile fiber product, and that is appropriate for allowing the urethane resin having a blocked isocyanate group at the end thereof per se to condense and bind to the textile fiber product, thus exhibiting primer-like function. In this regard, the amount of urethane resin having a blocked isocyanate group at the end thereof blended can be, for example, 0.5 to 40% by weight, in the fiber-modifying agent. If the amount blended is larger than this level, the feeling of the textile fiber product can harden, and if the amount blended is smaller, the color fastness can lower. Preferably, the amount blended is not more than 20% by weight, more preferably not more than 10% by weight.

(2-4) Treatment Step

The fiber-modifying treatment in the present invention can be performed by applying a fiber-modifying agent containing at least an aqueous polyvalent cationic salt solution and a urethane resin having a blocked isocyanate group at the end thereof (or separately an aqueous polyvalent cationic salt solution and a urethane resin having a blocked isocyanate group at the end thereof) to the entire or a required portion of the textile fiber product by, for example, a padding process, coating process, screen printing process, inkjet process, or spraying process.

After thus applying a fiber-modifying agent (or separately an aqueous polyvalent cationic salt solution and a urethane resin having a blocked isocyanate group at the end thereof) to a textile fiber product, a masking printing step alone or both a masking printing step and an ordinary printing step can be carried out in a wet state, or after spontaneous drying or thermal drying.

The thermal drying can be carried out by heating at 100 to 180 degrees Celsius for 10 to 180 seconds at least a portion of the textile fiber product to which an aqueous polyvalent cationic salt solution and a urethane resin having a blocked isocyanate group at the end thereof have been applied, using, for example, an air supply drier or a hot press.

(3) Printing Steps (3-1) Masking Printing Step and Ordinary Printing Step

The masking printing step is for printing by an inkjet process a masking ink on a portion of the textile fiber product that has been subjected to a specified fiber-modifying treatment to form a masking image.

On the other hand, the ordinary printing step is to print an ordinary ink by an inkjet process on a portion or all of a masking image formed through the masking printing step to form an ordinary image. When there is a portion with no masking images formed thereon in the portion that has been is subjected to the specified fiber-modifying treatment, it is possible to form an image by printing an ordinary ink even on such a portion with no masking images formed.

Both or either one of
a functional group of a self-emulsifying urethane resin and/or an acrylic resin having an acid value of 40 to 100 mg KOH/g,
and
a functional group of a water-soluble polymer dispersing agent,
in the masking ink to be inkjet-printed in the masking printing step and/or the ordinary ink to be inkjet-printed in the ordinary printing step, crosslinks or condenses with a urethane resin having a blocked isocyanate group at the end thereof. Thereby, both or either one of
the self-emulsifying urethane resin and/or acrylic resin having an acid value of 40 to 100 mg KOH/g
and
the water-soluble polymer dispersing agent,
in the masking ink and/or ordinary ink, and the urethane resin become a water-insoluble integral entity and binds firmly to the fiber in the textile fiber product while containing a pigment in the ink, thus pigment-coloring the textile fiber product.

(3-2) Ink

The masking ink in the present invention contains at least a white or light-colored pigment, a water-soluble polymer dispersing agent, a self-emulsifying urethane resin and/or an acrylic resin having an acid value of 40 to 100 mg KOH/g, and an aqueous liquid as a solvent or disperse medium, and is capable of forming a white or light-colored masking image.

On the other hand, the ordinary ink in the present invention contains at least a pigment, a water-soluble polymer dispersing agent, a self-emulsifying urethane resin and/or an acrylic resin having an acid value of 40 to 100 mg KOH/g, and an aqueous liquid as a solvent or disperse medium, and is capable of forming an ordinary image.

(i) Pigment

A white or light-colored pigment is used in the masking ink in the present invention. It is preferable that the pigment used in the masking ink be a white pigment of high concealing performance, such as titanium dioxide, zinc oxide, or aluminum silicate. Thereof, titanium dioxide is more preferable because of its high shielding performance. The titanium dioxide used may be of any one of the anatase type, brookite type, and rutile type, with preference given to the rutile type because of high concealing performance.

As a rule, any pigment can be used for the ordinary ink in the present invention, as far as it is a pigment that can be used as a coloring material, whether an organic pigment or an inorganic pigment. Examples of pigments that can be used in ordinary inks include, but are not limited to, black pigments such as carbon black and iron oxide black pigment; yellow pigments such as azo pigments, imidazolone pigments, and titanium yellow pigment; red pigments such as azo pigments, quinacridone pigments, chromophtal pigments, diketopyrrolopyrrole pigments, and anthraquinone pigments; blue pigments such as phthalocyanine pigments; orange pigments such as indanthrene pigments; purple pigments such as dioxazine pigments; green pigments such as phthalocyanine pigments; and the like.

(ii) Water-soluble Polymer Dispersing Agent

Water-soluble polymer dispersing agents that can be used in the present invention include ones possessing pigment dispersing capability, for example, an emulsion polymer prepared from an aliphatic vinyl monomer, a (meth) acrylic acid ester monomer, styrene, or another substance that is copolymerizable therewith, and neutralized with a basic substance.

Examples of the aliphatic vinyl monomer include carboxyl-group-containing aliphatic vinyl monomers such as acrylic acid, methacrylic acid, itaconic acid, maleic acid, and fumaric acid, which may be used alone or in combination of two kinds or more.

(Meth)acrylic acid ester monomers, styrene, and other substances that are copolymerizable with the aliphatic vinyl monomer are used to increase the water resistance, dispersion stability, and over-time viscosity stability of a masking ink.

By neutralizing with a basic substance an emulsion polymer prepared therefrom, a water-soluble polymer dispersing agent is obtained. Examples of basic substances that can be used as neutralizing agents include ammonia, basic metal salts, primary amine compounds, secondary amine compounds, tertiary amine compounds, and the like.

(iii) Self-emulsifying Urethane Resin

When blended in a masking ink or ordinary ink, a self-emulsifying urethane resin produces fine particles and is unlikely to form a film because it contains a hydrophilic group, and it is suitable for continuous printing by an inkjet process, possesses excellent long-term storage stability, and allows the rewetting rate of the masking ink or ordinary ink to be 70 to 90%. An ink with such a rewetting rate, even in the event of head nozzle tip clogging due to ink drying, allows clogging to be eliminated by performing head cleaning using an ink or another aqueous liquid and the like. To adjust the rewetting rate of a masking ink or ordinary ink blended with a self-emulsifying urethane resin in the range of 70 to 90%, it is preferable that a water-soluble organic solvent as a wetting agent be blended in the masking ink or ordinary ink.

The self-emulsifying urethane resin, as the terminal hydrophilic group thereof crosslinks with the urethane resin having a blocked isocyanate group at the end thereof used in the fiber-modifying treatment, becomes hydrophobic and serves as a pigment binder of excellent fastness along with a crosslinked water-soluble polymer dispersing agent.

Because a water-soluble urethane resin is water-soluble per se, water resistance needed for the image portion is difficult to obtain when it is blended in a masking ink or ordinary ink. Because a forcibly emulsified urethane resin is hydrophobic per se and has been emulsion-polymerized with a surfactant, it has a large particle diameter and tends to form a film when it is blended in a masking ink or ordinary ink, and in continuous printing, defective pixels and print irregularities due to head nozzle tip clogging are likely to occur, and the long-term storage stability of the ink tends to decrease.

It is preferable for maintaining the feeling and elasticity of a textile fiber product that the 100% modulus of the self-emulsifying urethane resin blended in the masking ink or ordinary ink in the present invention be not more than 30 MPa, more preferably not more than 15 MPa. The 100% modulus of the urethane resin may be, for example, not more than 0.1 MPa.

To prevent the image portion formed on a textile fiber product using the method of the present invention from yellowing due to the influence of light, gaseous nitrogen oxide, and the like, the self-emulsifying urethane resin in the present invention is preferably a self-emulsifying urethane resin prepared with an aliphatic or alicyclic isocyanate as a starting material.

The self-emulsifying urethane resin of the present invention is for binding a white or light-colored pigment in a masking ink or a pigment in an ordinary ink to a textile fiber product, and as the amount blended increases, the fastness improves, but the feeling of the colored portion hardens. Therefore, the amount of self-emulsifying urethane resin blended per 100 parts by weight of a masking ink or ordinary ink in the present invention is preferably not more than 50 parts by weight, more preferably not more than 30 parts by weight, and still more preferably not more than 20 parts by weight.

(iv) Acrylic Resin Having an Acid Value of 40 to 100 mg KOH/g

An acrylic resin having an acid value of 40 to 100 mg KOH/g, when it is blended in a masking ink or ordinary ink, becomes hydrophobic as the terminal hydrophilic group crosslinks with the urethane resin having a is blocked isocyanate group at the end thereof used in the fiber-modifying treatment, and along with the crosslinked water-soluble polymer dispersing agent, forms a pigment binder of excellent fastness.

Generally, an acrylic resin used to pigment-color a fiber is hydrophobic, and when it is blended in a masking ink or ordinary ink, it is likely to form a film, and poses a problem of head nozzle tip clogging in continuous printing.

On the other hand, the acrylic resin used in the present invention is highly hydrophilic because its acid value is in the range of 40 to 100 mg KOH/g. For this reason, it is possible that a rewetting rate of a masking ink or ordinary ink blended with this acrylic resin be 70 to 90%. Even in case of head nozzle tip clogging due to ink drying, an ink with such a rewetting rate allows the easy removal of clogging by performing head cleaning using an ink or another aqueous liquid and the like.

To adjust the rewetting rate of a masking ink or ordinary ink blended with an acrylic resin having an acid value of 40 to 100 mg KOH/g in the range of 70 to 90%, it is preferable that a water-soluble organic solvent as a wetting agent be blended in the masking ink or ordinary ink.

The term rewetting rate as used herein refers to the ratio of the weight of a coat dissolved due to rewetting to the weight of a starting dry coat of a masking ink or ordinary ink that has been allowed to stand at 40 degrees Celsius and a relative humidity of 30% or lower for 5 hours when the dry coat has absorbed water and dissolved with a sufficient amount of water added drop by drop to the dry coat [(weight of dry coat−weight of insoluble coat)/weight of dry coat].

With regard to a masking ink or ordinary ink blended with an acrylic resin, when the acid value of the acrylic resin is lower than 40 mg KOH/g, it is not easy to obtain rewetting performance needed to eliminate head nozzle tip clogging due to ink drying, and when the acid value is higher than 100 mg KOH/g, water resistance and other fastness needed for the image portion after printing is difficult to maintain.

It is preferable for the maintenance of the feeling of a textile fiber product that the glass transition temperature of the acrylic resin having an acid value of 40 to 100 mg KOH/g blended in the masking ink or ordinary ink in the present invention be −60 to 20 degrees Celsius, more preferably in the range of −50 to 0 degrees Celsius, and still more preferably in the range of −40 to −10 degrees Celsius.

The acrylic resin having an acid value of 40 to 100 mg KOH/g in the present invention is for binding a white or light-colored pigment in the masking ink or a pigment in the ordinary ink to a textile fiber product. When the amount blended increases, the fastness improves; however, there arise problems such as hardening of the feeling of the colored portion and increased likelihood of head nozzle tip clogging. Therefore, the amount of acrylic resin having an acid value of 40 to 100 mg KOH/g blended per 100 parts by weight of the masking ink or ordinary ink of the present invention is preferably not more than 30 parts by weight, more preferably not more than 20 parts by weight, and still more preferably not more than 10 parts by weight.

(v) Aqueous Liquid

An aqueous liquid is used as a solvent or disperse medium in the masking ink and ordinary ink.

As the aqueous liquid, water or a mixture of water and a water-soluble organic solvent and the like can be used.

Examples of water-soluble organic solvents include, but are not limited to:

glycols and glycerins such as ethylene glycol, diethylene glycol, triethylene glycol, propylene glycol, butylene glycol, polyethylene glycol, polypropylene glycol, glycerin, and diglycerin as wetting agents;

methanol, ethanol, n-propanol, isopropanol, n-butanol, isobutanol, t-butanol, 2-pyrrolidone, N-methyl-2-pyrrolidone, propylene glycol monomethyl ether, ethylene glycol monoethyl ether, ethylene glycol monomethyl ether, methyl ethyl ketone, ethyl acetate, and ethylene glycol mono-n-butyl ether as surface tension, solubility, or drying speed surface tension regulating agents;

and the like. Such water-soluble organic solvents may be used alone or in combination of two kinds or more.

(vi) Preparation of Masking Ink and Ordinary Ink

The masking ink in the present invention can be obtained by, for example, mixing at least a white or light-colored pigment for masking ink, an aqueous liquid as a solvent or disperse medium, and a water-soluble polymer dispersing agent, wet-dispersing the mixture using glass beads, zirconia beads, titania beads, or the like in a milling machine (beads mill) to yield a is pigment dispersion, and mixing the pigment dispersion with a self-emulsifying urethane resin and/or an acrylic resin having an acid value of 40 to 100 mg KOH/g, and an aqueous liquid as a solvent or disperse medium. The ordinary ink in the present invention can also be obtained by this same treatment except that "the white or light-colored pigment for masking ink" is replaced with "a pigment for ordinary ink".

The pigment dispersion may, for example, be one containing a pigment solid at 5 to 50% by weight, which, however, is not limiting.

With regard to a masking ink or ordinary ink blended with these components, even in the event of head nozzle tip clogging, the likelihood of eliminating clogging by performing head cleaning using an ink or another aqueous liquid or the like by, for example, having a rewetting rate in the range of 70 to 90% by choosing a type or amount of the aqueous liquid as a solvent or disperse medium or types or amounts of other components.

If the rewetting rate is lower than 70%, head nozzle tip clogging cannot easily be eliminated, and if the rewetting rate is higher than 90%, the elimination of clogging is easier, but there arise a problem of inability to maintain fastness such as water resistance needed for the image portion after printing; therefore, these levels are undesirable.

In addition, by adjusting the viscosity of the ink at 20 degrees Celsius in the range of 3 to 30 mPa·s, or adjusting the surface tension of the ink in the range of 20 to 50 mN/m, or adjusting both the viscosity and surface tension in these ranges, by choosing a type or amount of the aqueous liquid as a solvent or disperse medium, or choosing types or amounts of other components, it is possible to obtain an ink that is more suitable for printing by an inkjet process.

Separating coarse particles 1 micro m or more in diameter by filter filtration or centrifugation is suitable for obtaining an ink that is suitable for printing by an inkjet process.

In obtaining the above-described pigment dispersion, a dispersing aid can be used to supplement the dispersing capability. By using an anionic surfactant as a dispersing aid to supplement the dispersing capability of a water-soluble polymer dispersing agent, it is possible to obtain improved dispersion efficiency, pigment particle micronization, and over-time stability by suppression of separation, thickening, and the like during storage of the masking ink or ordinary ink.

To improve the washing fastness or color fastness to rubbing of a textile fiber product, the masking ink or ordinary ink in the present invention may be blended with a block isocyanate compound as a curing agent for both or either one of a water-soluble polymer dispersing agent, and, a self-emulsifying urethane resin and/or an acrylic resin having an acid value of 40 to 100 mg KOH/g, in the ink.

The block isocyanate compound thus blended crosslinks with both or either one of
a functional group of a self-emulsifying urethane resin and/or an acrylic resin having an acid value of 40 to 100 mg KOH/g
and
a functional group of a water-soluble polymer dispersing agent,
in the masking ink and/or ordinary ink, and they become water-insoluble and firmly bind to the textile fiber product.

As the block isocyanate compound that can be blended in the masking ink or ordinary ink as described above, it is possible to use one having a group that becomes reactive, upon heating (for example, heating at 100 degrees Celsius or higher), with both or either one of
a functional group of a self-emulsifying urethane resin and/or an acrylic resin having an acid value of 40 to 100 mg KOH/g
and
a functional group of a water-soluble polymer dispersing agent,
in the ink (for example, ones having 2 or 3 or more such functional groups).

Block isocyanate compounds preferred to prevent the image formed on the textile fiber product from yellowing due to the influence of light, gaseous nitrogen oxide, and the like include aliphatic or alicyclic block isocyanate compounds. Examples thereof include
trimethylolpropane adducts or isocyanurates of
hexamethylene diisocyanate (HDI), isophorone diisocyanate (IPDI), dicyclohexylmethane diisocyanate (H12MDI), or hydrogenated xylylene diisocyanate (H6XDI),
wherein the isocyanate group is blocked. In this case, the blocking agent is preferably diethyl malonate, diisopropylamine, 1,2,4-triazole, 3,5-dimethylpyrazole, or MEKO 2-butanonoxime, which, however, are not to be construed as limiting.

The block isocyanate compound in the present invention can be used as an oligomer resulting from reacting some of the isocyanate groups thereof with polyol, polycarbonate, polyester, or polyether, or the like.

The block isocyanate compound to be blended in the masking ink or ordinary ink in the present invention is preferably one that has been made to have water solubility or self-emulsifying property by the addition of a hydrophilic group. The masking ink or ordinary ink blended with such a block isocyanate compound having water solubility or self-emulsifying property may be of low viscosity and excellent redispersibility.

Furthermore, in addition to the above-described components, the masking ink or ordinary ink in the present invention may be blended with, for example, a thickener, an ultraviolet absorbent, an antioxidant, a wax, a defoaming agent, an anti-settling agent, a crosslinking catalyst, a chelating agent, a surfactant, and the like.

(3-3) Inkjet Printing Machine

The choice of inkjet printing machine for printing a masking ink or ordinary ink by an inkjet process in the printing step is not particularly limited, but one having a piezo type nozzle head is preferred.

Examples of such printing machines include, but of course are not limited to, EPSON PX-V700, EPSON PM-40000PX, Mimaki TX-16005, FUJIFILM DMP-2831, MASTERMIND MMP8130 (all are trade names), and the like.

(4) Image Heat Treatment Step

The method for image formation of the present invention, when having no ordinary printing step, may have an image heat treatment step for heat treatment (for example, at 100 to 220 degrees Celsius for 1 to 10 minutes) on is at least a portion of a textile fiber product, on which a masking image has been formed by an inkjet process after a specified fiber-modifying treatment.

The method for image formation of the present invention, when having an ordinary printing step, may have an image heat treatment step for heat treatment (for example, at 100 to 220 degrees Celsius for 1 to 10 minutes) on at least a portion of a textile fiber product, on which a masking image and/or ordinary image has been formed by an inkjet process after a specified fiber-modifying treatment.

Thereby, the urethane resin having a blocked isocyanate group at the end thereof, used in the fiber-modifying treatment, crosslinks or condenses with both or either one of a functional group of a self-emulsifying urethane resin and/or an acrylic resin having an acid value of 40 to 100 mg KOH/g and a functional group of a water-soluble polymer dispersing agent, in the masking ink and/or ordinary ink, and they become unified and water-insoluble and bind firmly to the fiber in the textile fiber product while containing a pigment in the ink to pigment-color the textile fiber product.

Heating temperature and heating time for the heat treatment are chosen in view of the heat resistance of the subject textile fiber product and the physical properties of the substances used for printing and the like. To ensure sufficient crosslinking, it is preferable that heat treatment be is performed at 100 to 220 degrees Celsius for 1 to 10 minutes, preferably at 100 to 180 degrees Celsius for 1 to 10 minutes, and still more preferably at 120 to 160 degrees Celsius for 2 to 5 minutes.

(5) Post-treatment Step

The method for image formation of the present invention, when having no ordinary printing step, may have a post-treatment step for performing a post-treatment by applying a post-treating agent to at least a portion of a textile fiber product, on which a masking image has been formed by an inkjet process after a specified fiber-modifying treatment, via the above-described image heat treatment step as required.

The method for image formation of the present invention, when having an ordinary printing step, may have a post-treatment step for performing a post-treatment by applying a post-treating agent to at least a portion of a textile fiber product, on which a masking image and/or ordinary image has been formed by an inkjet process after a specified fiber-modifying treatment, via the above-described image heat treatment step as required.

In all cases, the post-treating agent may be at least one kind selected from among acrylic resin emulsions, urethane resin emulsions, crosslinking agents, plasticizers, surfactants, flame retardants, silicone-based softening agents, and fluorine-based water repellents.

The post-treating agent can be applied to at least a required portion of a textile fiber product by a padding process, coating process, screen printing process, inkjet process, spraying process, or the like. These post-treatment agents may be blended with required additives such as an antistatic agent, is ultraviolet absorbent, antioxidant, defoaming agent, and drying inhibitor.

In both cases with and without an ordinary printing step, the post-treatment step may contain performing a heat treatment (e.g., at 100 to 180 degrees Celsius for 10 to 180 seconds) on a portion of the textile fiber product to which a post-treating agent has been applied.

By performing a post-treatment, a textile fiber product with additional effects such as improved feeling, improved color fastness, improved slippage, prevention of electrification, prevention of discoloration, and improved flame retardancy depending on the post-treating agent applied can be obtained.

EXAMPLES

The present invention is hereinafter described in further detail with reference to Examples, to which, however, the present invention is not limited. Note that "parts" as mentioned in Examples and elsewhere mean "parts by weight" unless otherwise stated.

<Preparation of Fiber-modifying Agent 1>

20 parts of calcium nitrate, 20 parts of ELASTRON F-29 (trade name for an urethane resin having a blocked isocyanate group at the end thereof; manufactured by Dai-ichi Kogyo Seiyaku Co., Ltd.), and 60 parts of water were mixed with stirring to yield a fiber-modifying agent 1.

<Preparation of Fiber-modifying Agent 2>

20 parts of magnesium sulfate, 20 parts of ELASTRON MF-25K (trade name for a urethane resin having a blocked isocyanate group at the end thereof; manufactured by Dai-ichi Kogyo Seiyaku Co., Ltd.), and 60 parts of water were mixed with stirring to yield a fiber-modifying agent 2.

<Preparation of White Pigment Dispersion>

50 parts of titanium dioxide, 3 parts of SN-DISPERSANT 5468 (trade name for a water-soluble polymer dispersing agent; manufactured by San Nopco Limited), 23.5 parts of water, 20 parts of diethylene glycol, 3 parts of urea, and 0.5 parts of SN DEFOAMER 777 (trade name for a defoaming agent; manufactured by San Nopco Limited) were mixed, and this mixture, along with zirconia beads 0.3 mm in diameter, was applied to a milling machine and dispersed for 1 hour. Thereafter, the zirconia beads were removed, and the dispersion was filtered through a membrane filter with a pore diameter of 1.0 micro m to yield a white pigment dispersion.

<Preparation of Masking Ink 1>

20 parts of the white pigment dispersion, 22 parts of glycerin, 20 parts of Superflex 470 (trade name for a self-emulsifying urethane resin; manufactured by Dai-ichi Kogyo Seiyaku Co., Ltd.), 2 parts of ethylene glycol, and 36 parts of water were mixed with stirring to yield a masking ink 1 having a viscosity at 20 degrees Celsius of 4.8 mPa·s and a surface tension of 38.8 mN/m.

The rewetting rate of the masking ink 1 was 84%.

<Preparation of Masking Ink 2>

20 parts of the white pigment dispersion, 22 parts of glycerin, 20 parts of TOCRYL X-3546 (trade name for an acrylic resin having an acid value of 55 mg KOH/g; manufactured by Toyo Ink Co., Ltd.), 3 parts of ethylene glycol, is and 35 parts of water were mixed with stirring to yield a masking ink 2 having a viscosity at 20 degrees Celsius of 5.1 mPa·s and a surface tension of 40.2 mN/m.

The rewetting rate of the masking ink 2 was 88%.

<Preparation of Masking Ink 3>

20 parts of the white pigment dispersion, 20 parts of glycerin, 10 parts of Superflex 470, 10 parts of TOCRYL X-3546, 10 parts of Fixer N (trade name for a block isocyanate compound; manufactured by Matsui Shikiso Chemical Co., Ltd.), 2 parts of ethylene glycol, and 28 parts of water were mixed with stirring to yield a masking ink 3 having a viscosity at 20 degrees Celsius of 5.1 mPa·s and a surface tension of 39.1 mN/m.

The rewetting rate of the masking ink 3 was 80%.

When the masking inks 1, 2, and 3 obtained were tested using a particle size analyzer (trade name: Microtrac UPA- EX150; manufactured by Nikkiso Co., Ltd.), no coarse particles having a maximum particle diameter of 1 micro m or more were found.

When the masking inks 1, 2 and 3 obtained were examined for over-time stability at 60 degrees Celsius for 1 week, no remarkable changes were observed in the viscosity and pigment particle diameter.

<Preparation of Ordinary Pigment Dispersion>

20 parts of a pigment, 8 parts of JONCRYL 57J (trade name for a water-soluble polymer dispersing agent; manufactured by BASF Japan Ltd.), 48.5 parts of water, 20 parts of diethylene glycol, 3 parts of urea, and 0.5 parts of SN DEFOAMER 777 were mixed, and this mixture, along with zirconia beads 0.3 mm in diameter, was applied to a milling machine and dispersed for 1 hour. Thereafter, the zirconia beads were removed, and the dispersion was filtered through a membrane filter with a pore diameter of 1.0 micro m to yield an ordinary pigment dispersion.

Dispersions prepared using C.I. Pigment Yellow 17, C.I. Pigment Red 122, C.I. Pigment Blue 15:3, and Carbon Black, which correspond to yellow, magenta, cyan, and black, respectively, as pigments were named ordinary pigment dispersion Y, ordinary pigment dispersion M, ordinary pigment dispersion C, and ordinary pigment dispersion K, respectively.

<Preparation of Ordinary Ink 1>

20 parts of an ordinary pigment dispersion, 22 parts of glycerin, 20 parts of ADEKA BONTIGHTER HUX-370 (trade name for self-emulsifying urethane resin; manufactured by ADEKA Corporation), 4 parts of ethylene glycol, and 34 parts of water were mixed with stirring to yield an ordinary ink 1.

Ordinary inks 1 prepared using the ordinary pigment dispersions (Y, M, C, K) were named the ordinary inks (1-Y, 1-M, 1-C, 1-K), respectively.

The viscosity at 20 degrees Celsius of each ordinary ink 1 obtained was 4.1 mPa·s for 1-Y, 3.8 mPa·s for 1-M, 3.8 mPa·s for 1-C, and 4.0 mPa·s for 1-K, and the surface tension was 32.2 mN/m for 1-Y, 33.3 mN/m for 1-M, 32.8 mN/m for 1-C, and 32.7 mN/m for 1-K.

The rewetting rate of each ordinary ink 1 was 80% for 1-Y, 83% for 1-M, 82% for 1-C, and 79% for 1-K.

<Preparation of Ordinary Ink 2>

20 parts of an ordinary pigment dispersion, 22 parts of glycerin, 20 parts of TOCRYL X-3546, 5 parts of ethylene glycol, and 33 parts of water were mixed with stirring to yield an ordinary ink 2.

Ordinary inks 2 prepared using the ordinary pigment dispersions (Y, M, C, K) were named the ordinary inks (2-Y, 2-M, 2-C, 2-K), respectively.

The viscosity at 20 degrees Celsius of each ordinary ink 2 obtained was 4.2 mPa·s for 2-Y, 3.8 mPa·s for 2-M, 3.9 mPa·s for 2-C, 4.0 mPa·s for 2-K, and the surface tension was 32.5 mN/m for 2-Y, 33.5 mN/m for 2-M, 33.1 mN/m for 2-C, and 32.9 mN/m for 2-K.

The rewetting rate of each ordinary ink 2 was 83% for 2-Y, 85% for 2-M, 85% for 2-C, and 81% for 2-K.

<Preparation of Ordinary Ink 3>

20 parts of an ordinary pigment dispersion, 20 parts of glycerin, 10 parts of ADEKA BONTIGHTER HUX-370, 10 parts of TOCRYL X-3546, 10 parts of Fixer N, 3 parts of ethylene glycol, and 27 parts of water were mixed with stirring to yield an ordinary ink 3.

Ordinary inks 3 prepared using the ordinary pigment dispersions (Y, M, C, K), respectively, were named the ordinary inks (3-Y, 3-M, 3-C, 3-K).

The viscosity at 20 degrees Celsius of each ordinary ink 3 obtained was 4.2 mPa·s for 3-Y, 3.9 mPa·s for 3-M, 3.8 mPa·s for 3-C, and 4.1 mPa·s for 3-K, and the surface tension was 32.4 mN/m for 3-Y, 33.3 mN/m for 3-M, 32.7 mN/m for 3-C, and 32.7 mN/m for 3-K.

The rewetting rate of each ordinary ink 3 was 77% for 3-Y, 80% for 3-M, 80% for 3-C, and 75% for 3-K.

When the ordinary inks 1, 2 and 3 obtained were tested using a particle size analyzer, no coarse particles having a maximum particle diameter of 1 micro m or more were found.

When the ordinary inks 1, 2 and 3 obtained were examined for over-time stability at 60 degrees Celsius for 1 week, no remarkable changes were observed in the viscosity and pigment particle diameter.

Example 1

Fiber-modifying Treatment

After the fiber-modifying agent 1 was padded to a black cotton knitted fabric at a wringing rate of 60%, the fabric was heat treated to dryness at 160 degrees Celsius for 60 seconds to yield a modified-fiber fabric 1.

Print Evaluation Test

The masking ink 1 was filled in an inkjet printer (MMP8130) manufactured by MasterMind Inc., and a white image in a solid pattern [i.e., monochromic and of uniform density] (masking image) was inkjet-printed on the modified-fiber fabric 1.

After printing, the modified-fiber fabric 1 was dried at 60 degrees Celsius for 10 minutes and heat treated at 150 degrees Celsius for 1 minute; a colored fabric having a bleedless white image formed thereon with excellent concealing performance and a soft feeling was obtained.

Printing Stability Test

When the modified-fiber fabric 1 was continuously inkjet-printed for 10 is minutes using the inkjet printer (MMP8130) filled with the masking ink 1, good discharge stability and printing stability were exhibited with no defective pixels, print irregularities, and the like.

Thereafter, the inkjet printer was disabled and allowed to stand at room temperature for 1 week while the masking ink 1 was in a state filled in the inkjet printer; thereafter, head cleaning was performed, and the modified-fiber fabric 1 was continuously printed for 10 minutes; good discharge stability and print stability were exhibited with no defective pixels, print irregularities, and the like as before the inkjet printer was allowed to stand.

Fastness Test

The colored fabric obtained was subjected to a washing fastness test in accordance with the JIS L-0217 103 method×5 times (5-grade rating method); good color fastness to washing with a rating of grade 4 was exhibited.

Example 2

Method of Fiber Modification

After the fiber-modifying agent 2 was padded to a black cotton knitted fabric at a wringing rate of 60%, the fabric was heat treated to dryness at 160 degrees Celsius for 60 seconds to yield a modified-fiber fabric 2.

Print Evaluation Test

The masking ink 2 was filled in an inkjet printer (MMP8130), and a white image in a solid pattern (masking image) was inkjet-printed on the modified-fiber fabric 2.

After printing, the modified-fiber fabric 2 was dried at 60 degrees Celsius for 10 minutes and heat treated at 150 degrees Celsius for 3 minutes; a colored fabric having a bleedless white image formed thereon with excellent concealing performance and a soft feeling was obtained.

Printing Stability Test

When the masking ink 2 was tested for printing stability using the modified-fiber fabric 2 in the same manner as Example 1, good discharge stability and printing stability were exhibited both before and after the inkjet printer was allowed to stand.

Fastness Test

When the colored fabric obtained was subjected to a washing fastness test in the same manner as Example 1, good fastness with a rating of grade 4-5 was exhibited.

Example 3

Print Evaluation Test

The masking ink 3 was filled in an inkjet printer (MMP8130), and a white image in a solid pattern (masking image) was inkjet-printed on the modified-fiber fabric 1 obtained in the same manner as Example 1.

After printing, the modified-fiber fabric 1 was dried at 60 degrees Celsius for 10 minutes and heat treated at 150 degrees Celsius for 3 minutes; a colored fabric having a bleedless white image formed thereon with excellent concealing performance and a soft feeling was obtained.

Print Evaluation Test

When the masking ink 3 was tested for printing stability using the is modified-fiber fabric 1 in the same manner as Example 1, good discharge stability and printing stability were exhibited both before and after the inkjet printer was allowed to stand.

Fastness Test

When the colored fabric obtained was subjected to a washing fastness test in the same manner as Example 1, good fastness with a rating of grade 4-5 was exhibited.

Example 4

Print Evaluation Test

The masking ink 1 and ordinary inks (1-Y, 1-M, 1-C, 1-K) were filled in an inkjet printer (MMP8130), and a white image in a solid pattern (masking image) was printed on the modified-fiber fabric 1 obtained in the same manner as Example 1 with the masking ink 1, after which a JIS X9201:2001 N3 (fruit basket) image (ordinary image) was printed with the ordinary inks (1-Y, 1-M, 1-C, 1-K) on the white image.

After printing, the modified-fiber fabric 1 was dried at 60 degrees Celsius for 10 minutes and heat treated at 150 degrees Celsius for 2 minutes; a colored fabric having a bleedless brilliant multicolor image formed thereon with excellent concealing performance, a soft feeling, and a fine texture was obtained.

Printing Stability Test

When the ordinary inks (1-Y, 1-M, 1-C, 1-K) were tested for printing stability using the modified-fiber fabric 1 in the same manner as Example 1, is good discharge stability and printing stability were exhibited both before and after the inkjet printer was allowed to stand.

Fastness Test

The colored fabric obtained was subjected to a washing fastness test in the same manner as Example 1, good fastness with a rating of grade 3-4 was exhibited.

Example 5

Print Evaluation Test

The masking ink 2 and the ordinary inks (2-Y, 2-M, 2-C, 2-K) were filled in an inkjet printer (MMP8130), and a masking image was printed on the modified-fiber fabric 1 obtained in the same manner as Example 1, with the masking ink 2 alone, according to the gradations of the JIS X9201:2001 N3 (fruit basket) image (hence, in accordance with the overall density of all colors of the N3 image), after which the N3 (fruit basket) image (ordinary image) was printed on the masking image with the ordinary inks (2-Y, 2-M, 2-C, 2-K) in agreement with the masking image.

After printing, the modified-fiber fabric 1 was dried at 60 degrees Celsius for 10 minutes and heat treated at 150 degrees Celsius for 3 minutes; a colored fabric having a bleedless brilliant multicolor image formed thereon with excellent concealing performance, a soft feeling, and a fine texture was obtained.

Printing Stability Test

When the ordinary inks (2-Y, 2-M, 2-C, 2-K) were tested for printing stability using the modified-fiber fabric 1 in the same manner as Example 1, is good discharge stability and printing stability were exhibited both before and after the fabric was allowed to stand.

Fastness Test

When the colored fabric obtained was subjected to a washing fastness test in the same manner as Example 1, good fastness with a rating of grade 4 was exhibited.

Example 6

Print Evaluation Test

An image was printed on the modified-fiber fabric 1 in the same manner as Example 5, except that the masking ink 2 was replaced with the masking ink 3, and the ordinary inks (2-Y, 2-M, 2-C, 2-K) were replaced with the ordinary inks (3-Y, 3-M, 3-C, 3-K).

After printing, the modified-fiber fabric 1 was dried at 60 degrees Celsius for 10 minutes and heated at 150 degrees Celsius for 3 minutes; a colored fabric having a bleedless brilliant multicolor image formed thereon with excellent concealing performance, a soft feeling, and a fine texture was obtained.

Printing Stability Test

When the ordinary inks (3-Y, 3-M, 3-C, 3-K) were tested for printing stability using the modified-fiber fabric 1 in the same manner as Example 1, good discharge stability and printing stability were exhibited both before and after the inkjet printer was allowed to stand.

Fastness Test

When the colored fabric obtained was subjected to a washing fastness test in the same manner as Example 1, good fastness with a rating of grade 4-5 was exhibited.

Examples 7 to 12

Post-treatment

Each of the colored fabrics obtained in Examples 1 to 6 was padded with a post-treating agent consisting of 3 parts of Faster XA (trade name for an acrylic resin emulsion; manufactured by Matsui Shikiso Chemical Co., Ltd.), 5 parts of Abrasion XF (trade name for a silicone-based softening agent; manufactured by Matsui Shikiso Chemical Co., Ltd.), and 92 parts of water at a wringing rate of 65% and dried at 100 degrees Celsius for 3 minutes and then heat treated at 160 degrees Celsius for 60 seconds.

When tested in the same manner as the washing fastness test performed in each Example, each post-treated fabric obtained was found to have fastness improved by about half a grade and a softener feeling compared with non-post-treated colored fabric.

Comparative Example 1

When the masking ink 1 was inkjet-printed and subjected to a print evaluation test in the same manner as Example 1, except that a black cotton knitted fabric not subjected to fiber-modifying treatment was used, a colored fabric of inadequate quality having an image formed thereon without concealing performance due to severe ink bleeding was obtained.

Comparative Example 2

Fiber-modifying Treatment

A black cotton knitted fabric was padded with a fiber-modifying agent NG1 obtained by mixing with stirring 20 parts of magnesium sulfate and 80 parts of water at a wringing rate of 60% and then heat treated to dryness at 160 degrees Celsius for 60 seconds to yield a modified-fiber fabric NG1.

Print Evaluation Test

When the masking ink 2 was inkjet-printed on the modified-fiber fabric NG1 and subjected to a print evaluation test in the same manner as Example 2, a white image with no bleeding but having inferior concealing power compared with the white image in Example 2 was formed, and a colored fabric of inadequate quality was obtained.

Fastness Test

When subjected to a washing fastness test in the same manner as Example 1, the colored fabric obtained was found to have a rating of grade 2, which was much inferior to the rating of the colored fabric of Example 2.

Comparative Example 3

Fiber-modifying Treatment

A black cotton knitted fabric was padded with a fiber-modifying agent NG2 obtained by mixing with stirring 20 parts of ELASTRON F-29 and 80 parts of water at a wringing rate of 60% and then heat treated to dryness at 160 degrees Celsius for 60 seconds to yield a modified-fiber fabric NG2.

Print Evaluation Test

When the masking ink 2 was inkjet-printed on the modified-fiber fabric NG2 and subjected to a print evaluation test in the same manner as Example 2, a colored fabric of inadequate quality having an image formed thereon is without concealing performance due to severe ink bleeding was obtained.

Comparative Example 4

Fiber-modifying Treatment

A black cotton knitted fabric was padded with a fiber-modifying agent NG3 obtained by mixing with stirring 20 parts of calcium nitrate, 10 parts of Mowinyl 966A (trade name for an acrylic resin emulsion; manufactured by Nichigo-Mowinyl Co., Ltd.), and 60 parts of water at a wringing rate of 60% and then heat treated to dryness at 160 degrees Celsius for 60 seconds to yield a modified-fiber fabric NG3.

Print Evaluation Test

When the masking ink 1 was inkjet-printed on the modified-fiber fabric NG3 and subjected to a print evaluation test in the same manner as Example 1, a bleeding-free white image with concealing performance was obtained, but a colored fabric of inadequate quality with a hard feeling and decreased elasticity was obtained.

Fastness Test

When subjected to a washing fastness test in the same manner as Example 1, the colored fabric obtained was found to have a rating of grade 3, which was inferior to the rating in Example 1.

Comparative Example 5

<Preparation of White Pigment Dispersion NG>

20 parts of titanium dioxide, 7 parts of Emulgen 108 (trade name for a nonionic surfactant; manufactured by Kao Corporation), 49.5 parts of water, 20 parts of diethylene glycol, 3 parts of urea, and 0.5 parts of SN DEFOAMER 777 (trade name for a defoaming agent; manufactured by San Nopco Limited) were mixed, and this mixture, along with zirconia beads 0.3 mm in diameter, was applied to a milling machine and dispersed for 1 hour. Thereafter, the zirconia beads were removed, and the dispersion was filtered through a membrane filter with a pore diameter of 1.0 micro m to yield a white pigment dispersion NG.

<Preparation of Masking Ink NG1>

Starting materials were treated in the same manner as <Preparation of masking ink 1>, except that the white pigment dispersion 1 was replaced with the white pigment dispersion NG, to yield a masking ink NG1.

When the masking ink NG1 obtained was tested using a particle size analyzer, coarse particles having a maximum particle diameter of 1 micro m or more were found.

When examined for over-time stability at 60 degrees Celsius for 1 week, the masking ink NG1 obtained was found to have an increased viscosity and an increased number of coarse particles having a maximum particle diameter of 1 micro m or more, and was not recognized as an ink suitable for inkjet printing.

Comparative Example 6

<Preparation of Masking Ink NG2>

Starting materials were treated in the same manner as <Preparation of masking ink 1>, except that Superflex 470 was replaced with Superflex E-4800 (trade name for a forcibly emulsified urethane resin; manufactured by Dai-ichi Kogyo Seiyaku Co., Ltd.), to yield a masking ink NG2.

When the masking ink NG2 obtained was tested using a particle size analyzer, coarse particles having a maximum particle diameter of 1 micro m or more were found.

When examined for over-time stability at 60 degrees Celsius for 1 week, the masking ink NG2 obtained was found to have an increased viscosity and an increased number of coarse particles having a maximum particle diameter of 1 micro m or more as in Comparative Example 5, and was not recognized as an ink suitable for inkjet printing.

Comparative Example 7

<Preparation of Masking Ink NG3>

Starting materials were treated in the same manner as <Preparation of masking ink 2>, except that TOCRYL X-3546 was replaced with NeoCryl A-662 (trade name for an acrylic resin having an acid value of 24 mg KOH/g; manufactured by Kusumoto Chemicals, Ltd.), to yield a masking ink NG3.

The rewetting rate of the masking ink NG3 obtained was 56%. Hence, the masking ink NG3 was an ink that is difficult in allowing the elimination of clogging by head cleaning and the like in case of clogging due to drying at the inkjet printer head nozzle tip, and was not recognized as an ink suitable for inkjet printing.

Comparative Example 8

The ordinary inks (1-Y, 1-M, 1-C, 1-K) were filled in an inkjet printer (MMP8130), and a JIS X9201:2001 N3 (fruit basket) image (ordinary image) was printed on a modified-fiber fabric 1 with the ordinary inks (1-Y, 1-M, 1-C, 1-K). After printing, the modified-fiber fabric 1 was dried at 60 degrees Celsius for 10 minutes and heat treated at 150 degrees Celsius for 1 minute; a colored fabric of inadequate quality having an unclear image with no concealing performance formed thereon was obtained.

What is claimed is:

1. A method for image formation having a masking printing step for printing a masking ink by an inkjet process on a portion that has been subjected to a specified fiber-modifying treatment in a textile fiber product to form a masking image,
wherein the specified fiber-modifying treatment has been performed by applying to the entire or a required portion of the textile fiber product at least an aqueous polyvalent cationic salt solution and a urethane resin having a blocked isocyanate group at the end thereof,
and wherein the masking ink comprises at least a white or light-colored pigment, a water-soluble polymer dispersing agent, a self-emulsifying urethane resin, which is not water-soluble, and an aqueous liquid as a solvent or disperse medium, and is capable of forming a white or light-colored masking image, wherein the self-emulsifying urethane resin does not have a blocked isocyanate group which is protected with a blocking agent and is to be regenerated by dissociation of the blocking agent.

2. The method for image formation according to claim 1, wherein the masking ink comprises a block isocyanate compound as a curing agent for both or either one of the water-soluble polymer dispersing agent, and, the self-emulsifying urethane resin, which is not water-soluble, in the masking ink.

3. The method for image formation according to claim 1, wherein the rewetting rate of the masking ink ranges from 70 to 90%.

4. The method for image formation according to claim 1, wherein the 100% modulus of the urethane resin having a blocked isocyanate group at the end thereof, used for the fiber-modifying treatment, is not more than 30 MPa.

5. The method for image formation according to claim 1, wherein the fiber-modifying treatment comprises heating a portion of the textile fiber product to which at least an aqueous polyvalent cationic salt solution and a urethane resin having a blocked isocyanate group at the end thereof have been applied, at 100 to 180 degrees Celsius for 10 to 180 seconds.

6. The method for image formation according to claim 1, wherein the method has an image heat treatment step for performing heat treatment on at least a portion of the textile fiber product where the masking image has been formed, at 100 to 220 degrees Celsius for 1 to 10 minutes.

7. The method for image formation according to claim 1, wherein the method has a post-treatment step for performing a post-treatment by applying a post-treating agent to at least a portion of the textile fiber product where the masking image has been formed.

8. The method for image formation according to claim 7, wherein the post-treating agent is at least one of an acrylic resin emulsion, a urethane resin emulsion, a crosslinking agent, a plasticizer, a surfactant, a flame retardant, a silicone-based softening agent, and a fluorine-based water repellent, and
wherein the post-treatment step comprises performing heat treatment on a portion of the textile fiber product to which the post-treating agent has been applied, at 100 to 180 degrees Celsius for 10 to 180 seconds.

9. The method for image formation according to claim 1, wherein the method has an ordinary printing step for printing an ordinary ink by an inkjet process on a portion or all of the masking image formed by the masking printing step, to form an ordinary image, wherein the ordinary ink comprises at least a pigment, the water-soluble polymer dispersing agent, the self-emulsifying urethane resin, which is not water-soluble, and the aqueous liquid as the solvent or disperse medium, and is capable of forming an ordinary image, wherein the self-emulsifying urethane resin does not have the blocked isocyanate group which is protected with the blocking agent and is to be regenerated by dissociation of the blocking agent.

10. The method for image formation according to claim 9, wherein the ordinary ink comprises a block isocyanate compound as a curing agent for both or either one of the water-soluble polymer dispersing agent, and, the self-emulsifying urethane resin, which is not water-soluble, in the ink.

11. The method for image formation according to claim 9, wherein the rewetting rate of the ordinary ink ranges from 70 to 90%.

12. The method for image formation according to claim 9, wherein the method has an image heat treatment step for performing heat treatment on at least a portion of the textile fiber product where the masking image and/or ordinary image has been formed, at 100 to 220 degrees Celsius for 1 to 10 minutes.

13. The method for image formation according to claim 9, wherein the method has a post-treatment step for performing a post-treatment by applying a post-treating agent to at least a portion of the textile fiber product where the masking image and/or ordinary image has been formed.

14. The method for image formation according to claim 1, wherein the self-emulsifying urethane resin, which is not water soluble and has a terminal hydrophilic group, becomes hydrophobic as the terminal hydrophilic group crosslinks with the urethane resin having a blocked isocyanate group at the end thereof used in the fiber-modifying treatment to form a pigment binder.

15. The method for image formation according to claim 1, wherein the masking ink further comprises an acrylic resin having an acid value of 40 to 100 mg KOH/g, which has a terminal hydrophilic group, wherein each of the self-emulsifying urethane resin, which is not water-soluble and the acrylic resin becomes hydrophobic as the terminal hydrophilic group crosslinks with the urethane resin having a blocked isocyanate group at the end thereof used in the fiber-modifying treatment to form a pigment binder.

16. The method for image formation according to claim 1, wherein the masking ink further comprises an acrylic resin having an acid value of 40 to 100 mg KOH/g.

17. A method for image formation, the method comprising:
applying at least an aqueous polyvalent cationic salt solution and a urethane resin having a blocked isocyanate group at the end thereof to an entire or a required portion of a textile fiber product to form a treated textile product;

printing a masking ink by an inkjet process on a portion of the treated textile product to form a masking image, wherein the masking ink comprises at least a white or light-colored pigment, a water-soluble polymer dispersing agent, a non-water-soluble self-emulsifying urethane resin, and an aqueous liquid as a solvent or disperse medium, and is capable of forming a white or light-colored masking image, wherein the self-emulsifying urethane resin does not have a blocked isocyanate group which is protected with a blocking agent and is to be regenerated by dissociation of the blocking agent.

18. The method for image formation according to claim 17, wherein the masking ink further comprises an acrylic resin having an acid value of 40 to 100 mg KOH/g, which has a terminal hydrophilic group, each of the non-water-soluble self-emulsifying urethane resin and the acrylic resin becoming hydrophobic as the terminal hydrophilic group crosslinks with the urethane resin having a blocked isocyanate group at the end thereof used in the fiber-modifying treatment to form a pigment binder.

19. The method for image formation according to claim 17, wherein the self-emulsifying urethane resin, which is not water-soluble and has a terminal hydrophilic group, becomes hydrophobic as the terminal hydrophilic group crosslinks with the urethane resin having a blocked isocyanate group at the end thereof used in the fiber-modifying treatment to form a pigment binder.

20. The method for image formation according to claim 17, wherein the masking ink comprises a block isocyanate compound as a curing agent for both or either one of the water-soluble polymer dispersing agent, and, the non-water-soluble self-emulsifying urethane resin, in the masking ink.

21. A method for image formation, the method comprising:
a masking printing step for printing a masking ink by an inkjet process on a portion of a textile fiber product that has been subjected to a specified fiber-modifying treatment in a textile fiber product to form a masking image, wherein the specified fiber-modifying treatment applies at least an aqueous polyvalent cationic salt solution and a urethane resin having a blocked isocyanate group at the end thereof to an entire or a required portion of the textile fiber product, wherein the masking ink comprises at least a white or light-colored pigment, a water-soluble polymer dispersing agent, a self-emulsifying urethane resin, which is not water-soluble, and an aqueous liquid as a solvent or disperse medium, and is capable of forming a white or light-colored masking image, wherein the masking ink does not include an acrylic resin, wherein the self-emulsifying urethane resin does not have a blocked isocyanate group which is protected with a blocking agent and is to be regenerated by dissociation of the blocking agent.

* * * * *